(12) United States Patent
Bruner et al.

(10) Patent No.: US 6,249,429 B1
(45) Date of Patent: Jun. 19, 2001

(54) PCT BRACKET MOUNTED ON DRIVE INSTEAD OF PCBA

(75) Inventors: Curtis H. Bruner, Niwot; David Ellis, Longmont, both of CO (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/112,254

(22) Filed: Jul. 8, 1998

(51) Int. Cl.[7] .................................................... G06F 1/16
(52) U.S. Cl. ........................ 361/685; 361/679; 361/683; 361/684; 361/686
(58) Field of Search .................................. 361/679, 683, 361/684–686

(56) References Cited

U.S. PATENT DOCUMENTS

| | | |
|---|---|---|
| 5,392,175 * | 2/1995 | Beecroft ........................ 360/97.01 |
| 5,500,779 | 3/1996 | Diel . |
| 5,689,727 | 11/1997 | Bonke et al. . |
| 5,694,267 | 12/1997 | Morehouse et al. . |
| 5,710,675 | 1/1998 | Goldstone et al. . |
| 5,862,011 * | 1/1999 | Sega et al. ........................ 360/98.01 |

* cited by examiner

*Primary Examiner*—Leo P. Picard
*Assistant Examiner*—Yean-Hsi Chang
(74) *Attorney, Agent, or Firm*—W. Daniel Swayze, Jr.; W. James Brady; Frederick J. Telecky, Jr.

(57) ABSTRACT

A head-disk assembly 200 is directly connected to a host computer by arm 120 and arm 130. A housing connector 100 which includes the arms 120 and 130 is directly connected to the host computer to provide physical support for the head-disk assembly. Electrical connection to the host computer is through an electrical connector 300 of a printed circuit board 400. Consequently, there is no need for a large printed circuit board.

1 Claim, 3 Drawing Sheets

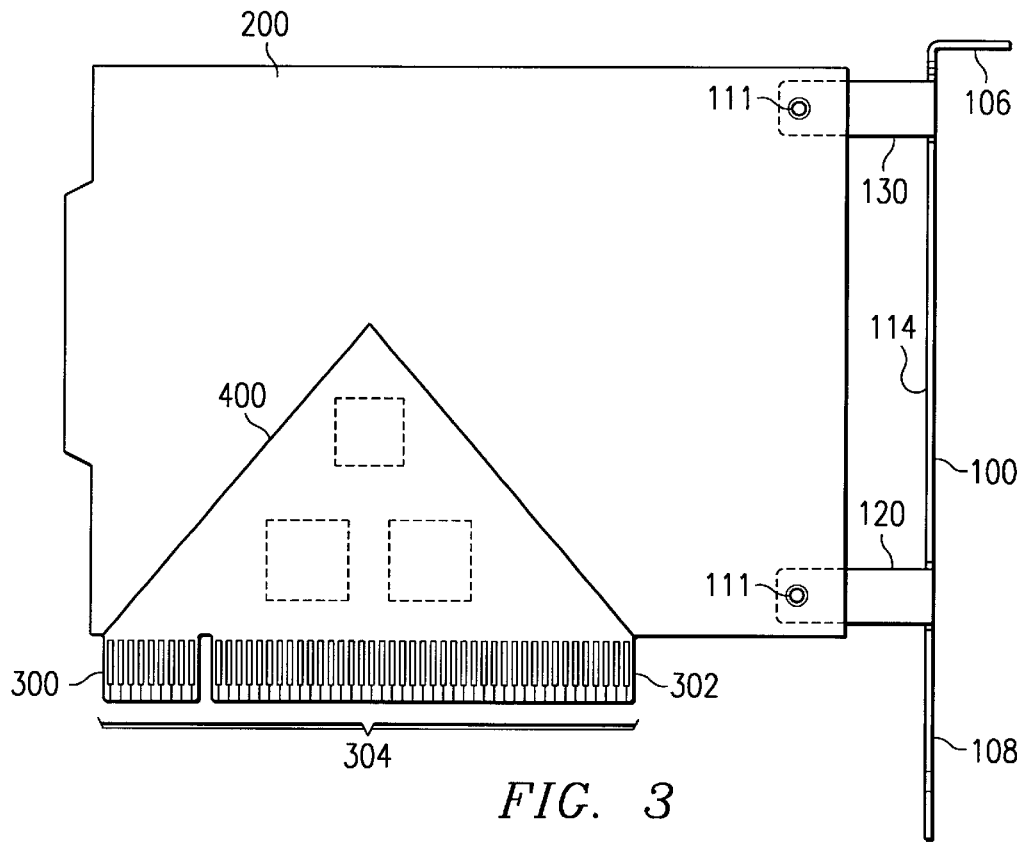
FIG. 3
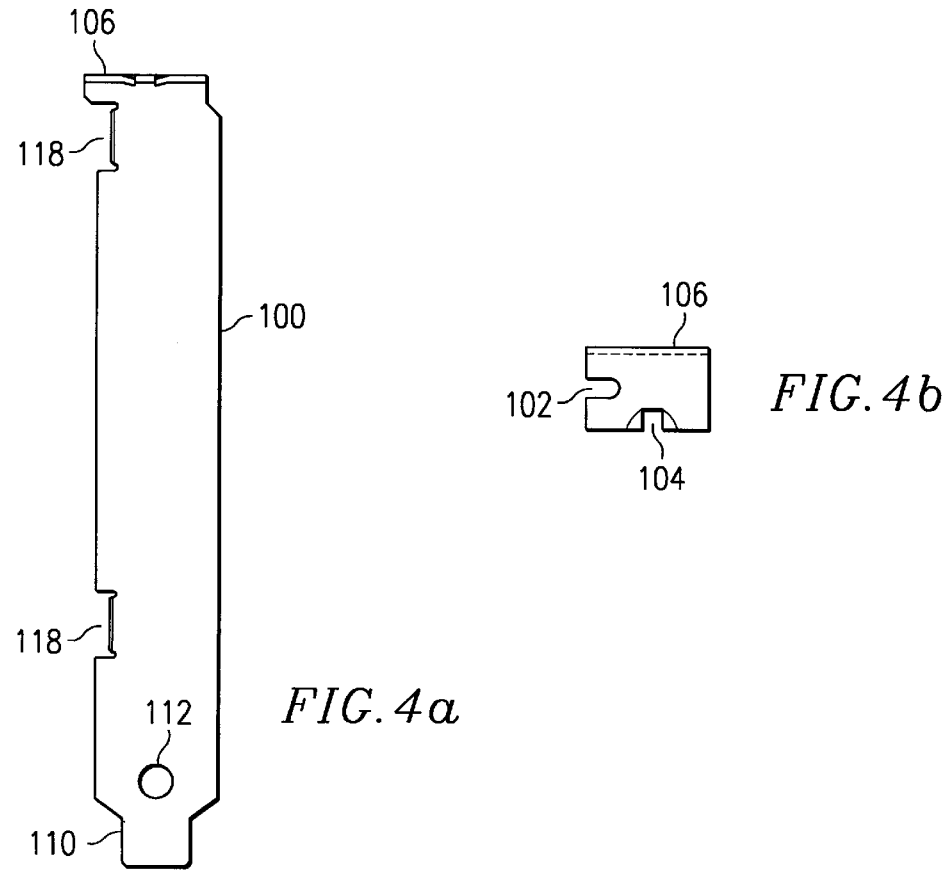
FIG. 4a
FIG. 4b

PCT BRACKET MOUNTED ON DRIVE INSTEAD OF PCBA

TECHNICAL FIELD OF THE INVENTION

The present invention relates to a connector and more particularly to a housing connector that couples a housing containing a hard disk drive and a spin motor to a host computer.

BACKGROUND OF THE INVENTION

Rotating magnetic disk data storage devises or "Hard Disk Drives" are an important part of computer systems.

These disk drives provide reliable permanent data storage along with rapid access to the data which is on the magnet disk. The Hard disk drive (HDD) usually includes a transducer to produce a magnetic field to magnetize an area on the rotating disk and to sense a magnetic field from the magnetic area on the rotating disk. This magnetic area represents information that the user designated to have stored. This transducer usually is positioned at the end of an actuator arm which is moved by a voice coil motor. Typically, the hard disk drives are enclosed and may be mounted on a flexible printed circuit board to provide for connection to the electronics needed to control the reading and writing of data. However, these printed circuit boards are expensive and add significantly to the over all cost of the HDD.

Hard disk drives are typically sensitive to movement and consequently, must be rigidly attached to the host computer system to avoid being subjected to excessive external loads or vibration. However, these hard disk drives should be removable from the host computer.

The information that is stored on the hard disk drive is at time to time transferred between different computer systems. One solution to this problem is to load such information on to a floppy disk or to send such information over a phone line. However, such methods have inherent disadvantages. These disadvantages are magnified when the amount of data to be transferred is large.

Another problem is there is a need to increase the memory available for use by the host computer. This problem is solved somewhat by plugging the hard disk drive in the slot of the host system.

The Personal Computer Memory Card International Association (PCMCIA) has developed standards for memory cards which can be plugged into slots within the host computer. The standards include a Type I format, a Type II format and a Type III format. These formats are distinguishable by card thickness. Thus, memory can be added to the host computer by merely plugging in an additional card. The information contained on the memory is then accessible by the host computer. Under other circumstances, memory can be simply available to the computer to increase the memory capability. The standardized format of these cards allows the user to plug in the memory card of one computer into another computer regardless of the type or make of either system.

FIG. 1 illustrates one such card of the prior art. In FIG. 1, a housing bracket 510 is connected to a printed circuit board 514 through connectors 512. Each of the connectors 512 is typically an integral part of housing bracket 510 and is coupled to the printed circuit board 514 through screws. The printed circuit board 514 includes a connector 500 for electrical connection to the host computer and for connection to the hard disk drive unit 516.

As illustrated in FIG. 1, since the printed circuit board 514 is used both for a mount and a support for the hard disk drive unit 514 and for connection, through the housing connector 510, to the host computer, a printed circuit board 514 with a large area is required. It is desired to reduce cost by reducing the size of the printed circuit board.

SUMMARY OF INVENTION

The present invention includes a housing connector directly connected to a head-disk assembly (HDA) and directly connected to the host computer.

The present invention reduces the size of the printed circuit board to an area which is less than the area of the head-disk assembly.

The present invention eliminates the need for the head disk assembly to be mounted on the printed circuit board so that connection to the host computer can be made.

The present invention can reduce the width of the printed circuit board to the width of the connector to electrically connect the head-disk assembly HDA and the associated electronics to the host computer through the use of a standardized electrical connector, for example, PCMCIA standard connector. The present invention can reduce the length of the printed circuit board to a length that is sufficient to accommodate the integrated circuits of the head-disk assembly.

The objects and advantages of the present invention are readily apparent to one of ordinary skill in the art after reviewing the following detailed description and the accompanying drawings.

BRIEF DESCRIPTION OF THE DRAWINGS

FIG. 3 illustrates a bottom view of the present invention

FIG. 4a illustrates a front view of the housing connector and FIG. 4b illustrates a side view of the housing connector.

DETAILED DESCRIPTION OF THE INVENTION

Figure 1:
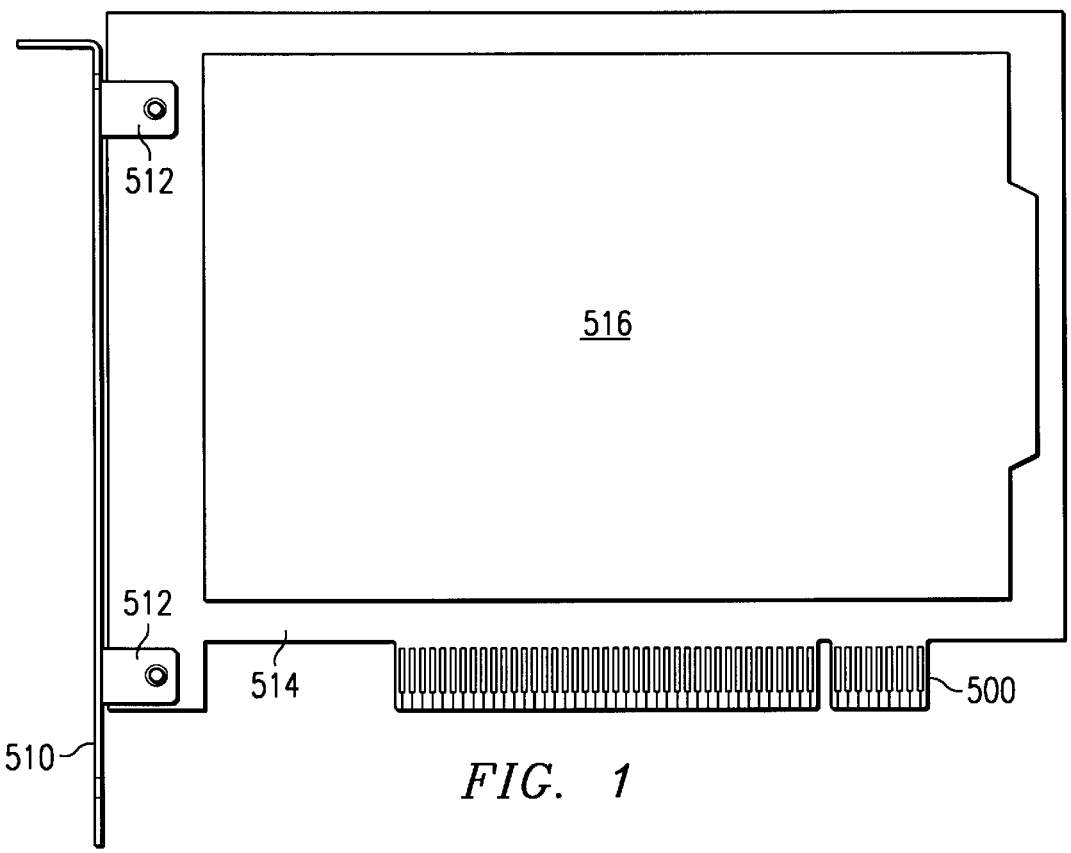
FIG. 1 illustrates a printed circuit board connected to a host computer.
Figure 2:
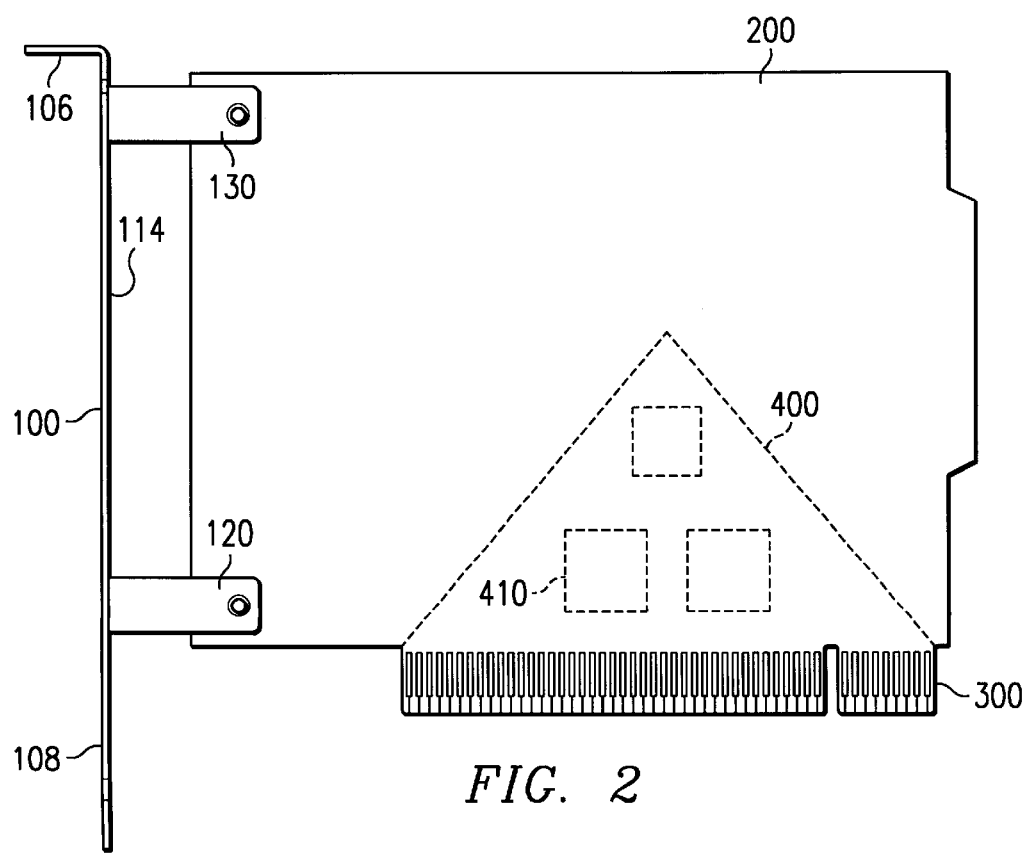
FIG. 2 illustrates a top view of the present invention.

FIG. 2 illustrates at top view of the housing connector 100 or bracket including a main body 114, the printed circuit board 400, and the head-disk assembly 200. The pin connector or electrical connector 300 for electrical connection to the host computer includes a plurality of pins to engage sockets and has a tail that extends from the housing of the connector 300. Connector 300 may be a PCMCIA connector. The tails are soldered to surface pads on the printed circuit board 400 to provide an electrical path between the electronic devices 410 and the host computer. The position of the electronic devices 410 can vary, and the number of electronic devices 410 may vary. The electrical devices 410 are physically mounted on the printed circuit board 400.

For protection of the electrical devices 410, the electrical devices 410 are mounted or sandwiched between the surface of the printed circuit board 400 and the head-disk assembly 200.

With the present invention, the width of the printed circuit board 400 may only extend from one end 302 of the printed circuit board 400 to the other end 304 of the printed circuit board 400. The reduction in width of the printed circuit board 400 reduces the area of printed circuit board 400.

There is no requirement that the length of the printed circuit board 400 extend to the edge of the head-disk assembly 200. Thus, the length of the printed circuit board 400 can be reduced to extend to a point under the head-disk assembly 200 and the area of the printed circuit board 400 is reduced.

The housing of the head-disk assembly 200 includes a cover plate and a base plate which are connected together to enclose the head-disk assembly 200. FIG. 2 additionally illustrates a housing connector 100 to prevent movement of the head-disk assembly 200, and to position the head-disk assembly 200 for electrical connection to for the host computer. The housing connector 100 is directly connected to the head-disk assembly 200 by arm 120 and arm 130. The arms 120 and 130 extend from the housing connector 100, as illustrated in FIG. 3, at an angle of approximately 90 degrees. The arms 120 and 130 are connected by screws 111 or rivets to the head-disk assembly 200. The arms 120 and 130 may be connected to the housing connector 100 by welding or may be formed integral with the housing connector 100. In another embodiment, arms 120 and 130 could be eliminated by forming flange 106 and housing connector 100 integral with assembly 200. Arms 120 and 130 could be eliminated by attaching directly connector 100 to assembly 200. A direct connection could be made by welding, screws snap fit, etc. Tab 108 extends from main body 114. Tab 108 and flange 106 may be formed integral with assembly 200. The printed circuit board 400 may extend to arm 120. The printed circuit board 400 may be any shape.

In FIG. 4(*a*), the housing connector 100 is shown as a front view, and FIG. 4(*b*) illustrates a side view of the housing connector 100. Channel 118 is formed from arms 120 and 130 as the arms 120 and 130 are bent to a position 90 degrees with respect to the housing connector 100. The depth of the channel 118 provides the position of the head-disk assembly 200 with respect to the housing connector 100 for example, a shallow depth of channel 118 results in the arms 120 and 130 positioning the head disk assembly 200 close to the bottom of the housing connector 100. A hole 112 as illustrated in FIG. 4*a* is used for connection to the host computer. Additionally, a narrow area 110 at the end of the housing connector 100 is used to fit into a slot in the chassis of the host computer. Narrow area 110 may not be required. Additionally, the housing connector 100 includes a flange 106 that may be formed by bending the end of the housing connector 90 degrees. The flange could be attached by welding to the housing connector 100.

As illustrated in FIG. 4(*b*), the flange 106 includes a hole 102 to receive a screw to prevent movement to with respect to the host computer. Additionally, the flange 106 includes a channel 104.

Figure 5:
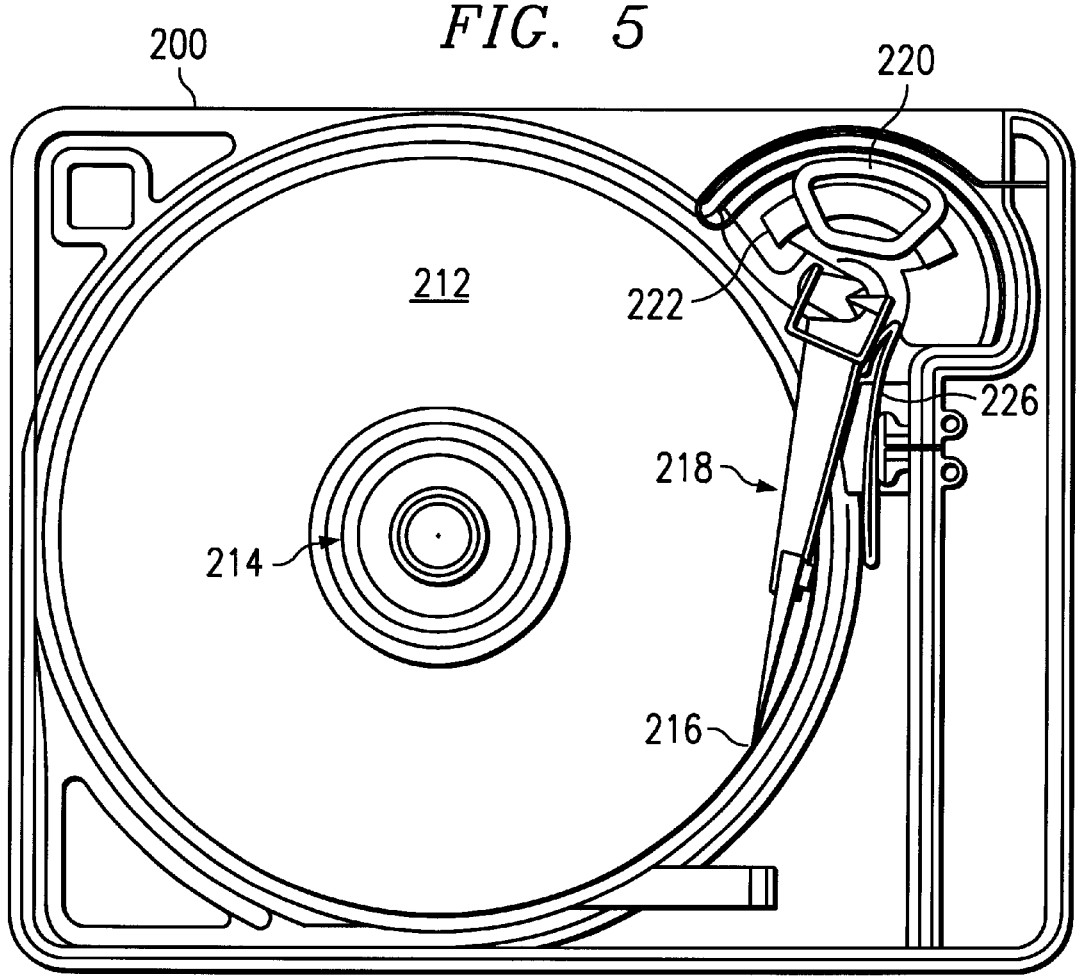
FIG. 5 illustrates a head-disk assembly.

As illustrated in FIG. 5, a head-disk assembly includes a magnetic disk 212 that is used to store data. The magnetic disk 212 is connected to a motor 214 which turns the magnetic disk 212 at a high rate of speed. The magnetic disk is read and written to by a magnetic head 216 which is mounted on a actuator arm assembly 218. The actuator arm assembly 218 is moved by a voice coil motor 220 that is connected to a magnet 222.

The arms 120 and 130 are directly connected to the head-disk assembly 200 and to the host computer. As a consequence of this direct connection between the head-disk assembly 200 and the host computer, the printed circuit board 400 can be substantially reduced in size since the printed circuit board is no longer required to extend to or beyond the HDA and consequently the printed circuit board 400 can be smaller in area than the head-disk assembly 200. Thus, the head-disk assembly 200 is connected to the host computer without the host computer being directly connected to the printed circuit board 400. A head-disk assembly 200 is directly connected to a host computer by arm 120 and arm 130. A housing connector 100 which includes arms 120 and 130 is directly connected to the host computer to provide physical support for the head-disk assembly. Electrical connection to the host computer is through a electrical connector 300. Consequently, there is no need for a large printed circuit board.

What is claimed is:

1. A connector for connection to a host computer, comprising:

a head-disk assembly to be connected to the host computer;

a printed circuit for electrical connection to the host computer;

a housing connector for direct connection to said head-disk assembly; and said host computer being directly coupled to said housing connector, wherein said housing connector includes holes to connect to said host computer.

* * * * *